US009718393B2

United States Patent
Sazuka

(10) Patent No.: US 9,718,393 B2
(45) Date of Patent: Aug. 1, 2017

(54) VEHICLE LAMP WITH A CONDUCTIVE REFLECTOR AND A GROUNDING CONNECTION TERMINAL

(71) Applicant: KOITO MANUFACTURING CO., LTD., Tokyo (JP)

(72) Inventor: Kiyoshi Sazuka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 49 days.

(21) Appl. No.: 14/621,117

(22) Filed: Feb. 12, 2015

(65) Prior Publication Data
US 2015/0224915 A1 Aug. 13, 2015

(30) Foreign Application Priority Data

Feb. 12, 2014 (JP) .................................. 2014-023993
Nov. 25, 2014 (JP) .................................. 2014-237624

(51) Int. Cl.
*B60Q 1/00* (2006.01)
*B60Q 1/04* (2006.01)
(Continued)

(52) U.S. Cl.
CPC ......... *B60Q 1/0094* (2013.01); *B60Q 1/0088* (2013.01); *B60Q 1/04* (2013.01); *F21S 48/1104* (2013.01); *F21S 48/1109* (2013.01); *F21S 48/1154* (2013.01); *F21S 48/1305* (2013.01); *F21S 48/1317* (2013.01); *F21S 48/1394* (2013.01); *F21S 48/31* (2013.01); *F21S 48/321* (2013.01); *F21S 48/325* (2013.01); *F21S 48/328* (2013.01); *F21S 48/1258* (2013.01); *F21Y 2103/10* (2016.08); *F21Y 2115/10* (2016.08)

(58) Field of Classification Search
CPC ............. F21Y 2101/02; F21Y 2115/10; B60Q 1/0088; B60Q 1/04; B60Q 1/0094; F21S 48/1104; F21S 48/31
See application file for complete search history.

(56) References Cited

U.S. PATENT DOCUMENTS 8,602,620 B2* 12/2013 Vollmer ............... F21S 48/1154
362/543
8,633,643 B2* 1/2014 Lee ...................... F21S 48/1159
257/99
(Continued)

FOREIGN PATENT DOCUMENTS

| JP | 2010-531037 A | 9/2010 |
|---|---|---|
| JP | 2013-161577 A | 8/2013 |
| KR | 20-0415780 Y1 | 5/2006 |

OTHER PUBLICATIONS

Office Action in counterpart Korean Patent Application No. 10-2015-0020148 issued on Nov. 14, 2016 (12 pages).

*Primary Examiner* — Robert May
(74) *Attorney, Agent, or Firm* — Osha Liang LLP

(57) ABSTRACT

In a vehicle lamp, light emitting diodes that emit light are disposed on an inner side of a transparent surface cover. A conductive reflector that reflects the light emitted from the light emitting diodes toward the surface cover is provided between the light emitting diodes and the surface cover. The reflector is disposed so as to be in proximity to the light emitting diodes. A grounding connection terminal is provided on the reflector. The grounding connection terminal is connected to a vehicle body.

4 Claims, 12 Drawing Sheets

(51) Int. Cl.
*F21S 8/10* (2006.01)
*F21Y 103/10* (2016.01)
*F21Y 115/10* (2016.01)

(56) References Cited

U.S. PATENT DOCUMENTS

2009/0230893 A1* 9/2009 Hohl-AbiChedid . B60Q 1/0023
315/313
2012/0257400 A1* 10/2012 Shibata ................. B60Q 1/076
362/460

* cited by examiner

VEHICLE LAMP WITH A CONDUCTIVE REFLECTOR AND A GROUNDING CONNECTION TERMINAL

CROSS REFERENCE TO RELATED APPLICATION(S)

This application is based on and claims priority under 35 U.S.C. §119 to Japanese Patent Application Nos. 2014-023993 (filed on Feb. 12, 2014) and 2014-237624 (filed on Nov. 25, 2014), the entire contents of which are incorporated herein by reference.

BACKGROUND

Technical Field

Exemplary embodiments of the invention relate to a vehicle lamp.

Related Art

As described in JP 2013-161577 A, recently a vehicle lamp has been proposed in which light emitting diodes are disposed on an inner side of a transparent surface cover and a conductive reflector for reflecting light emitted from the light emitting diodes toward the surface cover is disposed between the light emitting diodes and the surface cover so as to be in a state where the conductive reflector is in proximity to the light emitting diodes. Since the reflector is disposed so as to be in the state where the reflector is in proximity to the light emitting diodes, the vehicle lamp can be made compact.

SUMMARY

However, it has been found that in the above vehicle lamp, a failure rate of the light emitting diodes tends to be higher than that in vehicle lamps in which the reflector and the surface cover are distant from the light emitting diodes. The inventor has looked into this matter and found that electrostatic breakdown caused by static electricity occurred in the light emitting diodes that broke down.

Vehicles are washed when their bodies are stained. After the washing, the surface covers of vehicle lamps are wiped over with a cloth. While the vehicles are running, pebbles etc. may hit the surface covers of the vehicle lamps to cause rubbing therebetween. Furthermore, in a distribution stage of vehicles, static electricity may occur on the surface covers of the vehicle lamps due to friction. Accordingly, static electricity tends to occur on the surface covers of the vehicle lamps frequently or periodically.

Considering the above circumstances and the structure etc. of the above-described vehicle lamp, the inventor hit on a notion that static electricity occurring in the surface cover of the vehicle lamp could cause inductive charging or discharge and cause static electricity charging of the reflector which is in proximity to the light emitting diodes and then, the static electricity stored in the reflector could act on the light emitting diodes through discharge. The inventor has made the invention based on this notion.

One exemplary embodiment of the invention has been made in view of the above circumstances and prevents the light emitting diodes from breaking down due to static electricity in a vehicle lamp in which light emitting diodes are disposed on an inner side of a transparent surface cover and a conductive reflector for reflecting light emitted from the light emitting diodes toward the surface cover is disposed between the light emitting diodes and the surface cover so as to be in a state where the reflector is in proximity to the light emitting diodes.

(1) According to one exemplary embodiment, a vehicle lamp includes a transparent surface cover, light emitting diodes, a conductive reflector, and a grounding connection terminal. The light emitting diodes emit light. The light emitting diodes is disposed on an inner side of the transparent surface cover. The conductive reflector reflects the light emitted from the light emitting diodes toward the surface cover. The conductive reflector is provided between the light emitting diodes and the surface cover. The reflector is disposed so as to be in a state where the reflector is in proximity to the light emitting diodes. The grounding connection terminal is disposed on the reflector. The grounding connection terminal is connected to a vehicle body.

Preferred exemplary embodiments of the vehicle lamp of (1) will be described later in (2) to (5).

With the above described configuration, even if static electricity occurs that might otherwise cause static electricity charging of the reflector through inductive charging, discharge, or the like, the static electricity is immediately guided to the vehicle body via the grounding connection terminal. Therefore, such a phenomenon can be prevented that static electricity stored in the reflector is discharged between the reflector and the light emitting diode which is in proximity to the reflector (i.e., static electricity stored in the reflector is prevented from acting on the light emitting diode). As a result, the light emitting diode can be prevented from breaking down due to static electricity.

(2) The vehicle lamp of (1) may further include a conductive case. The conductive case houses a lighting control circuit configured to perform lighting control for the light emitting diodes. The conductive case is connected to the vehicle body. The grounding connection terminal is connected to the conductive case.

With this configuration, static electricity to be stored in the reflector is immediately guided to the vehicle body by means of the conductive case. Therefore, such a phenomenon can be prevented that static electricity stored in the reflector is discharged between the reflector and the light emitting diode which is in proximity to the reflector. As a result, the light emitting diode can be prevented from breaking down due to static electricity.

(3) The vehicle lamp of (1) may further include a resin circuit board and a grounding interconnection pattern. The resin circuit board is mounted with the light emitting diodes and the reflector. The grounding interconnection pattern is formed on the circuit board so as to be connected to the vehicle body. The grounding connection terminal of the reflector is connected to the grounding interconnection pattern.

With this configuration, static electricity to be stored in the reflector is immediately guided to the vehicle body by means of the grounding interconnection pattern on the circuit board. Therefore, such a phenomenon can be prevented that static electricity stored in the reflector is discharged between the reflector and the light emitting diode which is in proximity to the reflector. As a result, the light emitting diode can be prevented from breaking down due to static electricity.

Furthermore, since it is no longer necessary to use a grounding wire that is connected to the grounding connection terminal, the configuration is simplified and the number of components can be reduced.

(4) The vehicle lamp of (1) may further include a conductive base and a resin circuit board. The conductive base is connected to the vehicle body. The resin circuit board is disposed on the conductive base. The light emitting diodes and the reflector are mounted on the circuit board. The grounding connection terminal of the reflector is attached to the conductive base by screwing a metal screw into the grounding connection terminal, the circuit board, and the conductive base.

With this configuration, the reflector and the circuit board can be attached to the conductive base using the metal screw. Static electricity to be stored in the reflector is immediately guided to the vehicle body via the conductive base by means of the metal screw. Therefore, such a phenomenon can be prevented that static electricity stored in the reflector is discharged between the reflector and the light emitting diode which is in proximity to the reflector. As a result, the light emitting diode can be prevented from breaking down due to static electricity.

(5) In the vehicle lamp of (1), the state where the reflector is in proximity to the light emitting diodes may be a state where the reflector and the light emitting diodes are spaced from each other by 1 mm or less.

Even if the vehicle lamp is configured in this manner, static electricity to be stored in the reflector is immediately guided to the vehicle body. Therefore, such a phenomenon can be prevented that static electricity stored in the reflector is discharged between the reflector and the light emitting diode which is in proximity to the reflector. As a result, the light emitting diode can be prevented from breaking down due to static electricity.

DETAILED DESCRIPTION

Exemplary embodiments of the invention will be hereinafter described with reference to the accompanying drawings.

Figure 1:
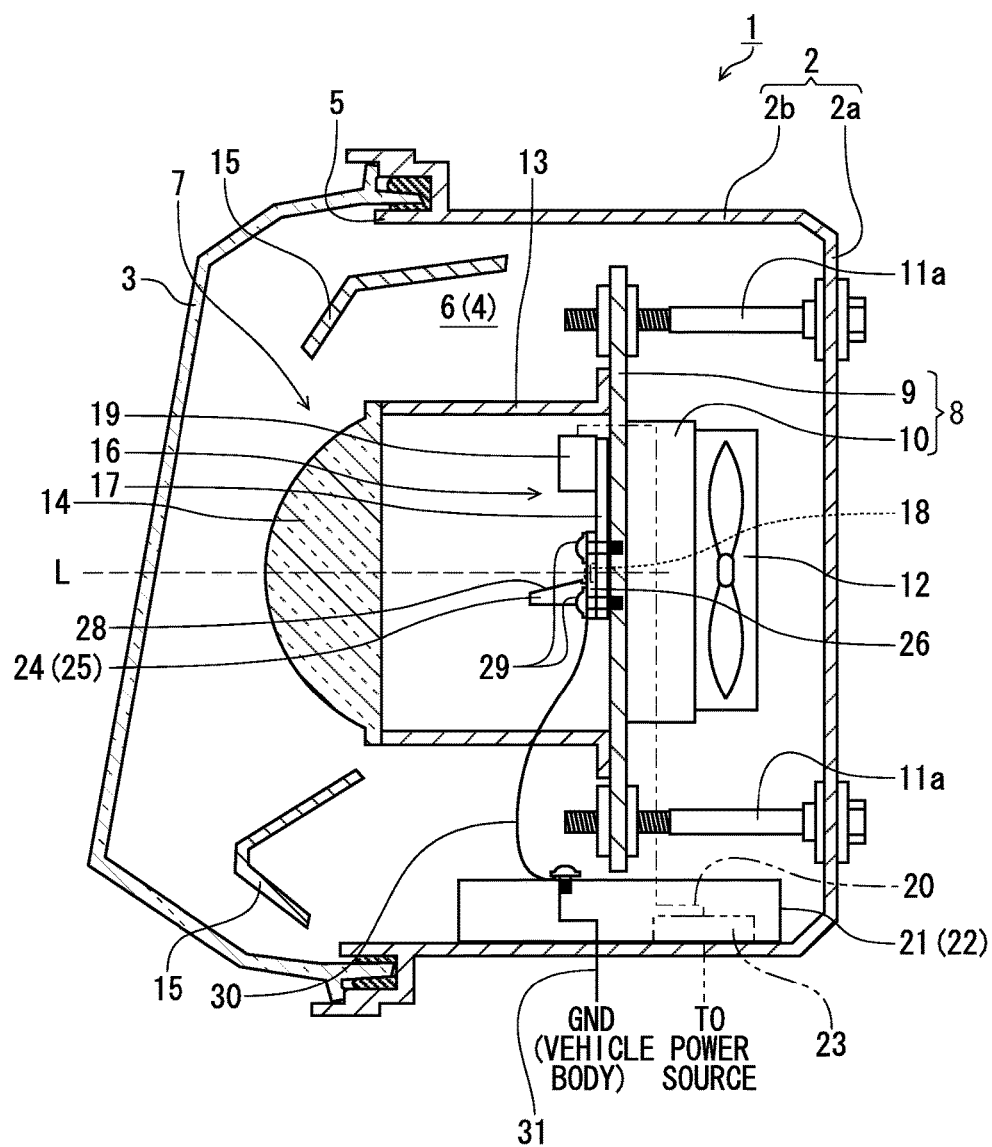
FIG. 1 is a vertical sectional view of a vehicle lamp according to a first exemplary embodiment.

In FIG. 1, reference numeral 1 denotes a vehicle lamp according to a first exemplary embodiment which is one of right and left headlamps (which will be referred to as a "headlamp".) The headlamp 1 is attached to a vehicle body at a front-left or front-right position and illuminates a region ahead of the vehicle.

As shown in FIG. 1, as for the appearance of the headlamp 1, the headlamp 1 includes a lamp body 2 and a front cover 3. The lamp body 2 is formed with a front opening. The front cover 3 (an example of a surface cover) closes the opening of the lamp body 2.

As shown in FIG. 1, the lamp body 2 includes a back wall 2a and a circumferential wall 2b. The back wall 2a raises vertically. The circumferential wall 2b projects forward (leftward in FIG. 1) from a circumference portion of the back wall 2a. The back wall 2a extends horizontally (i.e., in a direction perpendicular to the sheet surface of FIG. 1) while maintaining a constant height. The circumferential wall 2b defines a housing space 4 together with the back wall 2a. A front end portion of the circumferential wall 2b forms an opening 5 which is longer in the horizontal direction and is continuous with the housing space 4.

As shown in FIG. 1, the front cover 3 is detachably attached to the front end portion of the circumferential wall 2b of the lamp body 2. With this configuration, the front cover 3 and the lamp body 2 make up a lamp body assembly. Also, the front cover 3 and the lamp body 2 form an airtight lamp chamber 6 thereinside. The front cover 3 is transparent. Light emitted in the lamp chamber 6 is output to the outside through the front cover 3. In this exemplary embodiment, the front cover 3 (surface cover) is a resin lens.

As shown in FIG. 1, an LED unit 7 is disposed in the lamp chamber 6.

Figure 2:
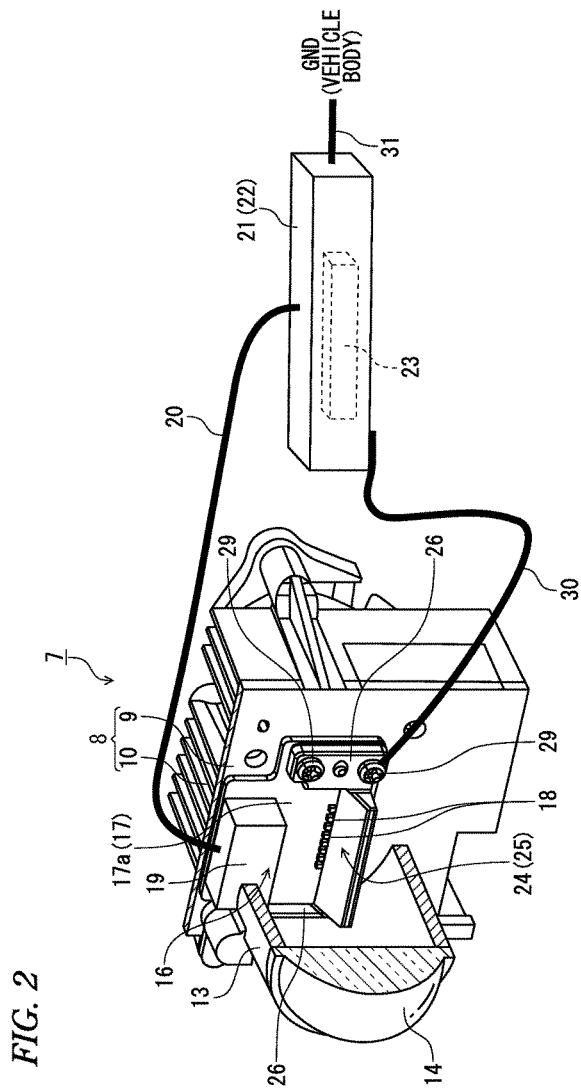
FIG. 2 is a perspective view showing an LED unit of the vehicle lamp according to the first exemplary embodiment.

As shown in FIGS. 1 and 2, the LED unit 7 is equipped with a metal heat sink 8 (e.g., aluminum die-cast product) which is an example of a conductive base. In this exemplary embodiment, the heat sink 8 has a metal support plate portion 9 and heat radiation fin portions 10 which are integrated together.

The support plate portion 9 is supported by the back wall 2a of the lamp body 2 via aiming screws 11a etc. A plate surface of the support plate portion 9 faces in the front and rear direction. The plate surface of the support plate portion 9 is spaced from the back wall 2a to the front side. The heat radiation fin portions 10 are attached to the rear surface of the support plate portion 9. The heat radiation fin portions 10 are cooled by a heat dissipation fan 12 attached to the heat sink 8.

FIG. 2 is drawn in such a manner that an upper portion of the support plate portion 9 is cut away so that the heat radiation fin portions 10 appear (FIGS. 5 to 7 and 9 are also drawn in this manner).

As shown in FIGS. 1 and 2, the LED unit 7 is also equipped with a cylindrical lens holder 13 and a projection lens 14. The projection lens 14 is attached to the lens holder 13.

A rear end portion (one end portion) of the lens holder 13 is attached to the front surface of the support plate portion 9. A front end portion (the other end portion) of the lens holder 13 extends forward. FIG. 2 is drawn in such a manner that a right-hand portion of the lens holder 13 is cut away to show a circuit board 17 etc. (which will be described later; FIGS. 5 to 7 and 9 are also drawn in this manner).

The projection lens 14 is attached to the front end portion of the lens holder 13. With this configuration, the projection lens 14 is disposed on an optical axis L which extends in a vehicle front and rear direction. The front cover 3 is disposed in front of the projection lens 14. A distance between the projection lens 14 and the front cover 3 is in a range of about 3 cm to about 15 cm.

In FIG. 1, reference numeral 15 denotes an extension reflector that is disposed around the projection lens 14 and the lens holder 13.

As shown in FIGS. 1 and 2, the LED unit 7 is equipped with a light emission module 16. The light emission module 16 includes a resin circuit board 17, plural light emitting diodes (hereinafter referred to as "LEDs") 18, and a power supply connector 19.

The circuit board 17 is disposed in the lens holder 13 and located on the front surface of the support plate portion 9. A circuit board surface 17a of the circuit board 17 is directed forward. The circuit board 17 is disposed closer to the upper wall of the lens holder 13. A power supply circuit (not shown) is formed on the circuit board surface 17a.

Figure 3:
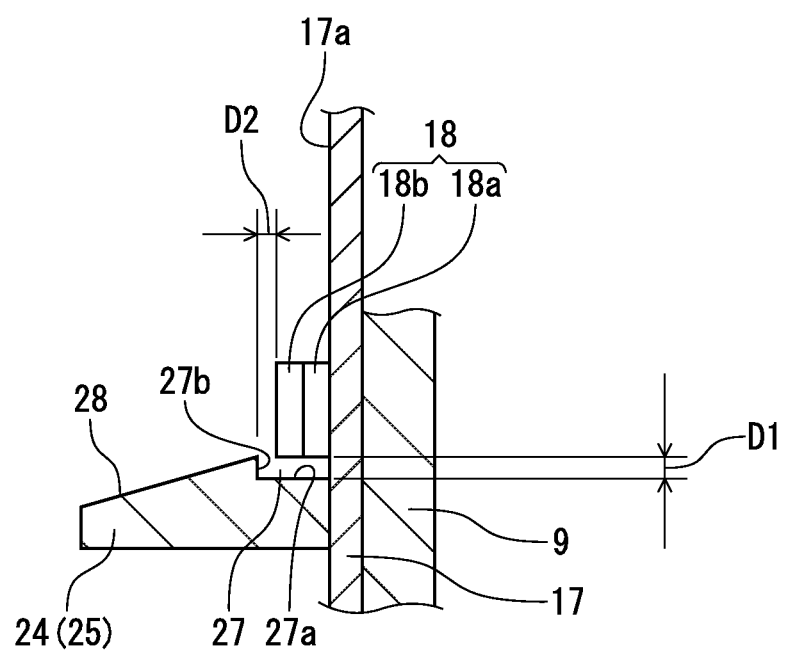
FIG. 3 is a vertical sectional view of a reflector of the vehicle lamp according to the first exemplary embodiment, taken at an approximate center of the reflector in a direction in which the reflector extends.

The LEDs 18 are attached to a lower portion of the circuit board surface 17a of the circuit board 17. To serve as a surface light source that emits light, the LEDs 18 are arranged in a vehicle width direction with the light emitting surfaces of the LEDs 17 being directed forward. In this exemplary embodiment, to emit white light, each LED 18 is configured in such a manner that a phosphor layer 18b is formed on an LED chip 18a (see FIG. 3).

The power supply connector 19 is attached to an upper portion of the circuit board surface 17a. A power source (not shown) is connected, by means of a wire harness 20, to the power supply connector 19 via an LED driver module (LDM) 21. The LEDs 18 are connected to the power supply connector 19 via the power supply circuit (not shown) which is formed on the circuit board surface 17a. The LED driver module 21 is disposed in a lower portion of the lamp body 2. The LED driver module 21 is equipped with a metal case 22 (an example of a conductive case) and a lighting control circuit 23 housed in the metal case 22. The power supply connector 19 and the power source (not shown) are connected to each other via the lighting control circuit 23 in the metal case 22. The lighting control circuit 23 controls the plural LEDs 18 to be turned on/off.

As shown in FIGS. 1 to 4, the LED unit 7 is equipped with a conductive reflector 24. The conductive reflector 24 includes a reflector portion 25 and a pair of attachment portions 26. The reflector portion 25 extends so as to have a band plate shape. The attachment portions 26 are located on both sides of the reflector portion 25 in the direction in which the reflector portion 25 extends. The attachment portions 26 are integral with the reflector portion 25. In this exemplary embodiment, the reflector portion 25 and the pair of attachment portions 26 are an integral aluminum die-cast product.

One of side surfaces of the reflector portion 25 is directed forward. The reflector portion 25 is placed on the circuit board surface 17a below the LEDs 18. The reflector portion 25 projects forward from the circuit board surface 17a with upper and lower surfaces of the reflector portion 25 being directed upward and downward. The upper surface of the reflector portion 25 is formed with a groove 27. In a region below the LEDs 18, a width of the groove 27 is slightly larger than a thickness of the LEDs 18. The groove 27 includes a step surface formed on the upper surface of the reflector portion 25 and the circuit board surface 17a. An inner surface of the groove 27 is close to the LEDs 18. In this exemplary embodiment, a distance D1 between a bottom surface 27a of the groove 27 and the LEDs 18 and a distance D2 between an outer vertical surface 27b of the groove 27 and the LEDs 18 are each set to be equal to or shorter than 1 mm (see FIG. 3).

Also, a vertical position of the opening of the groove 27 of the reflector portion 25 (i.e., an upper end of the outer vertical surface 27b) is at the approximately same height as the lower surfaces of the LEDs 18. Of the upper surface of the reflector portion 25, a portion on a front side of the upper end of the outer vertical surface 27b of the groove 27 substantially make up a reflection surface 28. The reflection surface 28 is inclined so as to go down from the upper end of the outer vertical surface 27b toward the forward side. The reflection surface 28 of the reflector portion 25 reflects light that is emitted from the LEDs 18 toward the projection lens 14 and the front cover 3.

The projection lens 14 is disposed in front of the reflector 24. A distance between the reflector 24 and the projection lens 14 is in a range of about 3 cm to about 15 cm.

Figure 4:
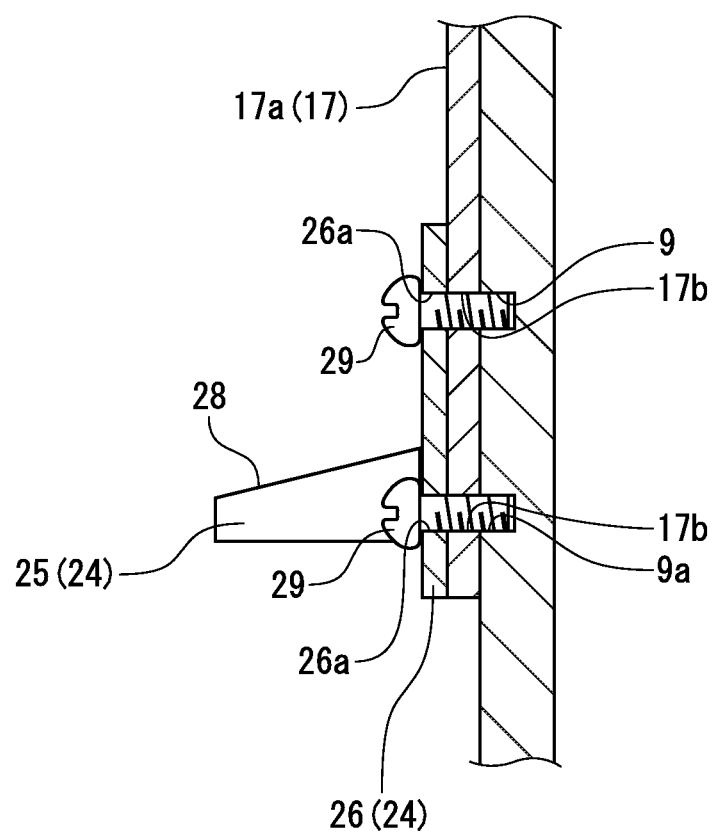
FIG. 4 is a vertical sectional view of the reflector, taken through a position near one end portion (attachment portion) of the reflector in the direction in which the reflector extends.

As shown in FIGS. 2 and 4, the pair of attachment portions 26 extend vertically with plate surfaces of the attachment portions being in contact with the circuit board surface 17a. Each attachment portion 26 is formed with attachment holes 26a at upper and lower positions. The circuit board 17 is formed with attachment holes 17b so that the attachment holes 17b correspond to the respective attachment holes 26a. Also, the support plate portion 9 of the heat sink 8 is formed with screw holes 9a so that the screw holes 9a correspond to the respective attachment holes 26a. Therefore, when the reflector 24 is positioned at its regular attachment position on the circuit board surface 17a, the attachment holes 26a of the attachment portions 26, the attachment holes 17b of the circuit board 17, and the screw holes 9a of the support plate portion 9 overlap with each other. With this positional relationship, tapping screws 29 (an example of metal screws) are inserted into the attachment holes 26a of the attachment portions 26 and the attachment holes 17b of the circuit board 17 and screwed into the screw holes 9a of the support plate portion 9, respectively. The reflector 24 is thereby attached to the support plate portion 9. At this time, the circuit board 17 is also attached to the support plate portion 9.

As shown in FIGS. 1 and 2, one end portion of a grounding wire harness 30 is connected to the attachment portion 26 by means of (a head of) the tapping screw 29. The other end portion of the grounding wire harness 30 is connected to the metal case 22. The metal case 22 is connected to the vehicle body by another grounding wire harness 31.

In the thus configured headlamp 1, the front cover 3 may be friction-charged with static electricity when, for example, it is wiped over with a cloth after the vehicle is washed. This static electricity may cause static electricity charging of the projection lens 14 and the reflector 24 (via the projection lens 14) through inductive charging or discharge. In particular, in this exemplary embodiment, since the front cover 3 is a resin lens, the front cover 3 tends to be charged with a large amount of static electricity, which may cause static electricity charging of the reflector 24 unless a proper measure is taken. However, in this exemplary embodiment, even if static electricity occurs that might otherwise cause charging of the reflector 24, the static electricity is immediately guided to the metal case 22 provided in the lamp chamber 6 by the attachment portion 26 and the grounding wire harness 30 and then guided to the vehicle body by the other grounding wire harness 31. Therefore, although the potential of the circuit board 17 decreases because of its connection to the connector 19 (ground), since as described above static electricity to be stored in the reflector 24 is immediately guided to the vehicle body, such a phenomenon can be prevented that static electricity stored in the reflector 24 is discharged between the reflector 24 and the LEDs 18 which are proximity to the reflector 24. Thus, it can be prevented that the LEDs 18 is electrically damaged (electrostatically breaking down).

Furthermore, since static electricity to be stored in the reflector 24 is immediately guided to the vehicle body to prevent discharge of the static electricity, otherwise expected occurrence of noise (static electricity surge) can also be prevented.

Figure 5:
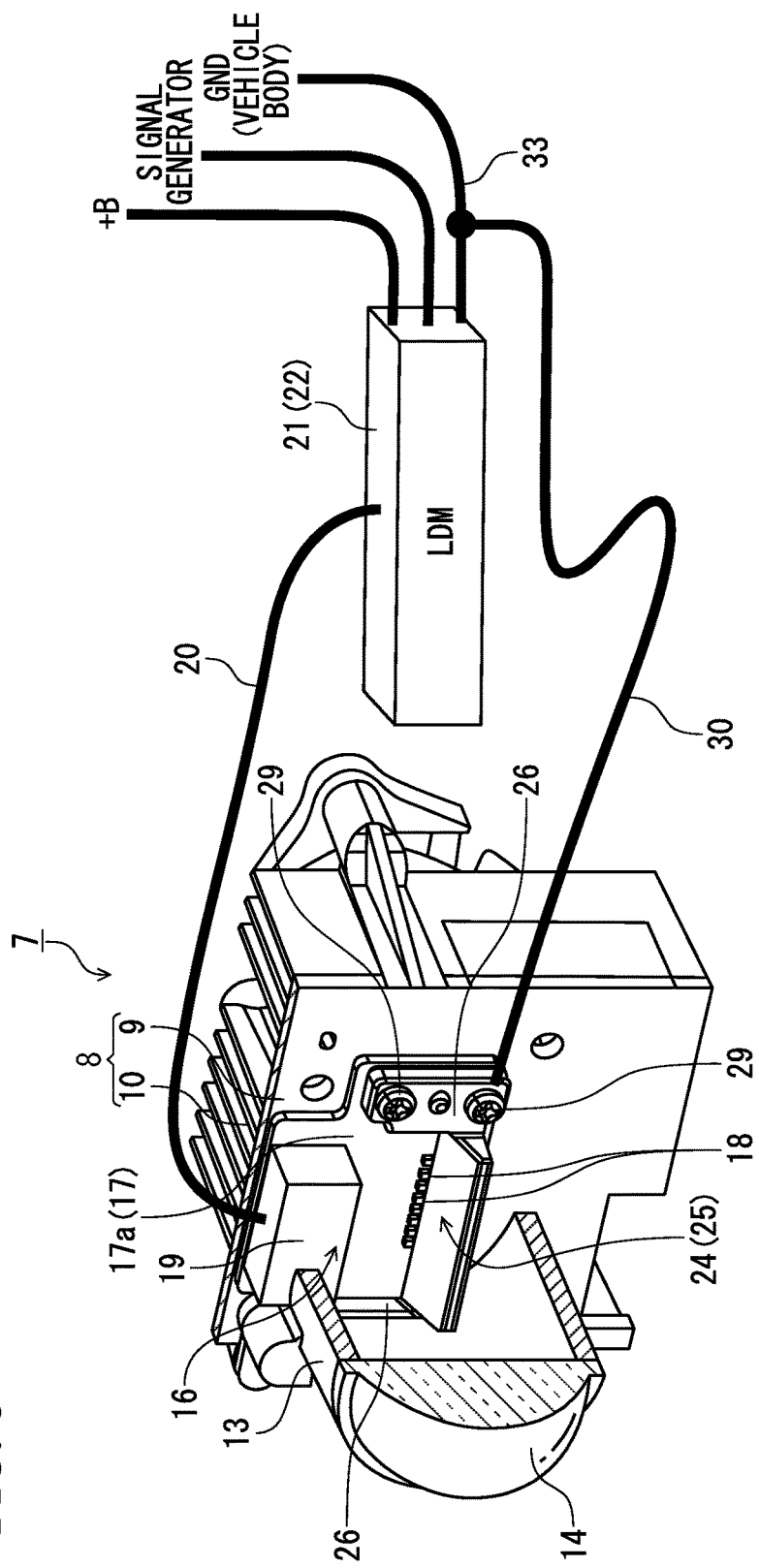
FIG. 5 is a perspective view showing an LED unit used in a vehicle lamp according to a second exemplary embodiment.
Figure 6:
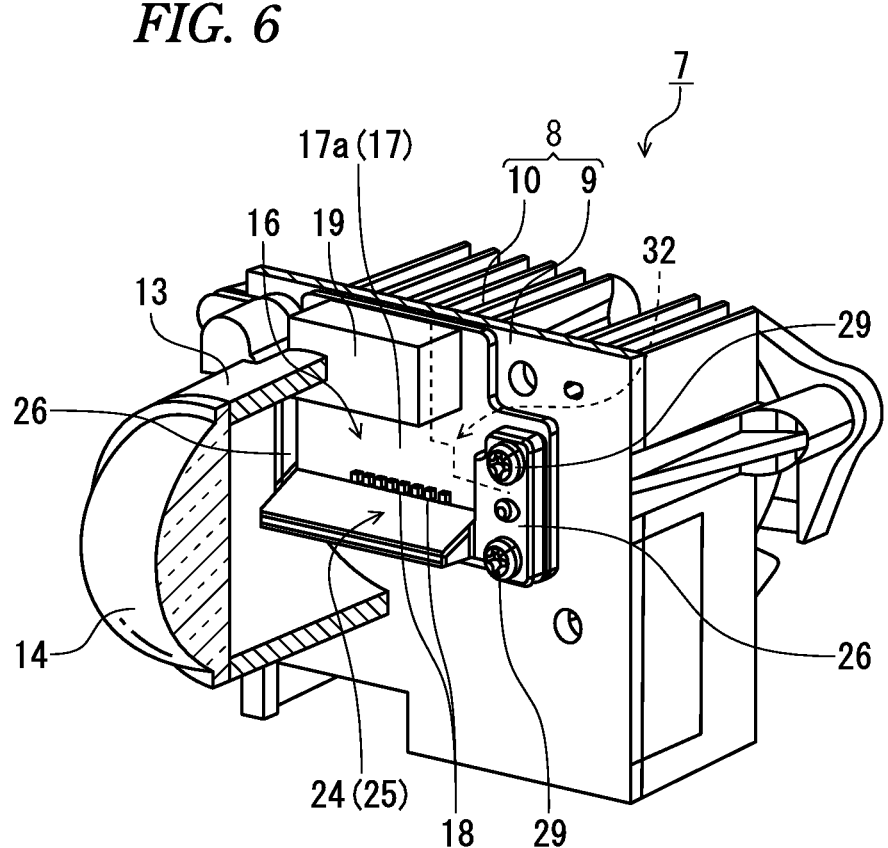
FIG. 6 is a perspective view showing an LED unit used in a vehicle lamp according to a third exemplary embodiment.
Figure 7:
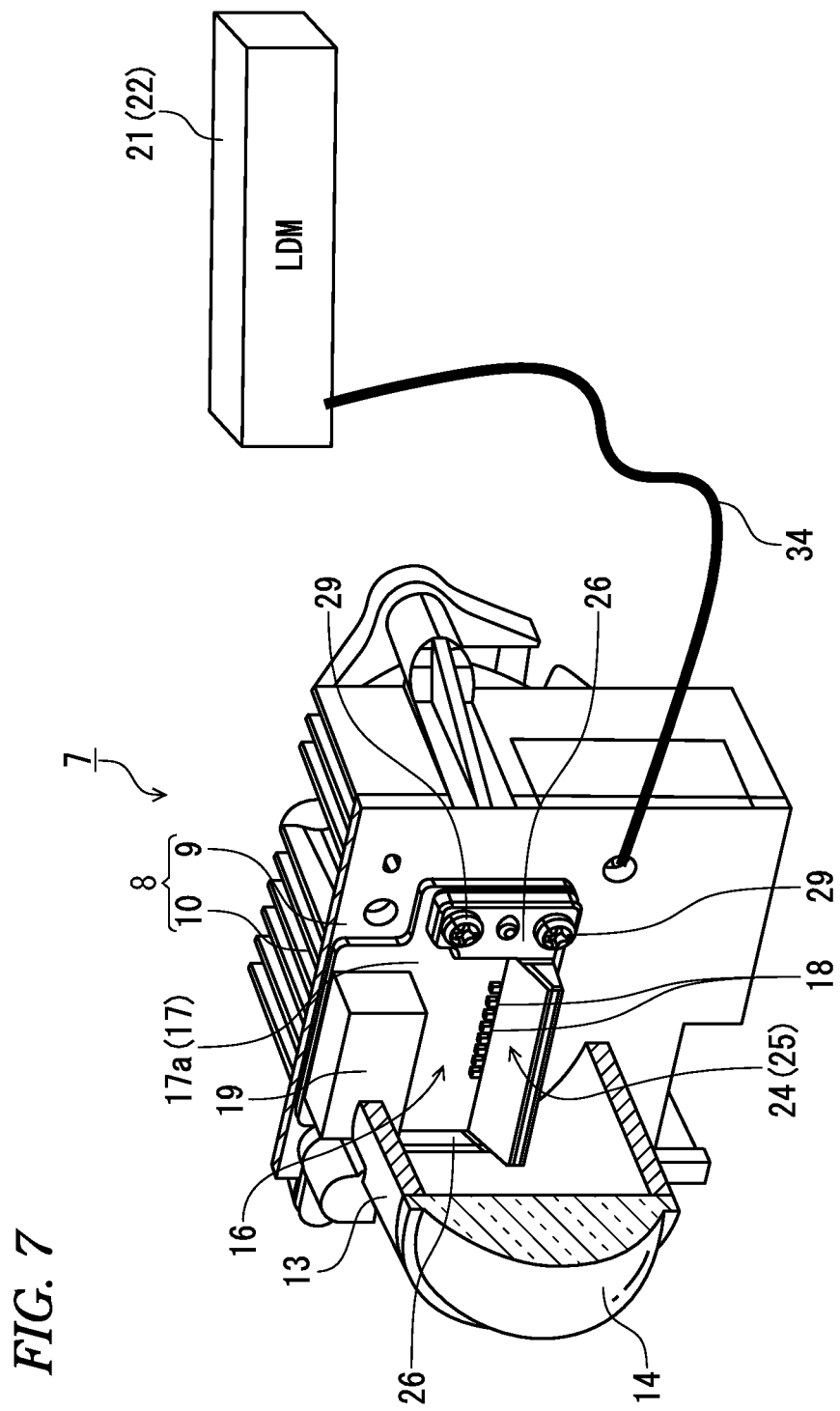
FIG. 7 is a perspective view showing an LED unit used in a vehicle lamp according to a fourth exemplary embodiment.
Figure 8:
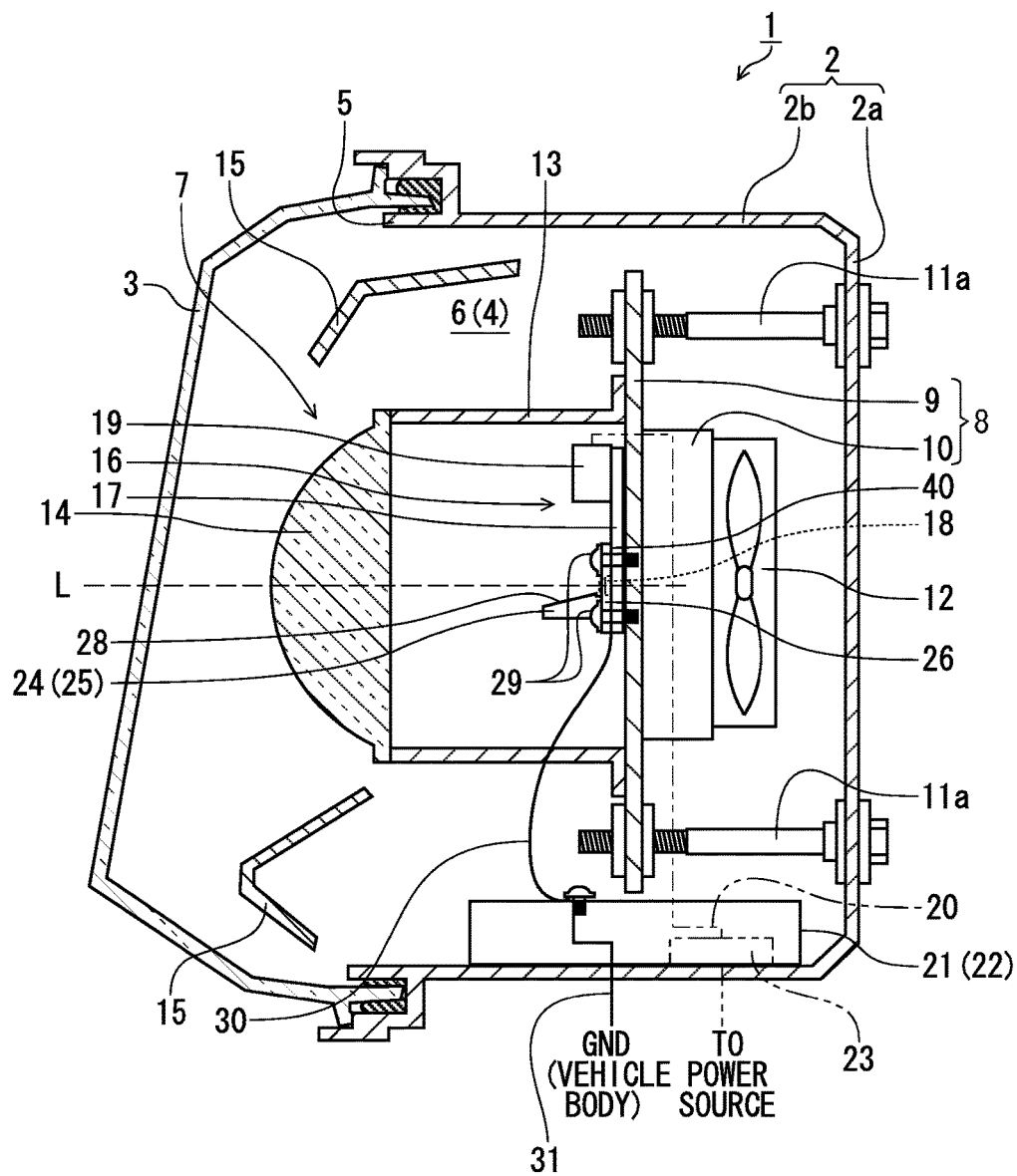
FIG. 8 is a vertical sectional view of a vehicle lamp according to a fifth exemplary embodiment.
Figure 12:
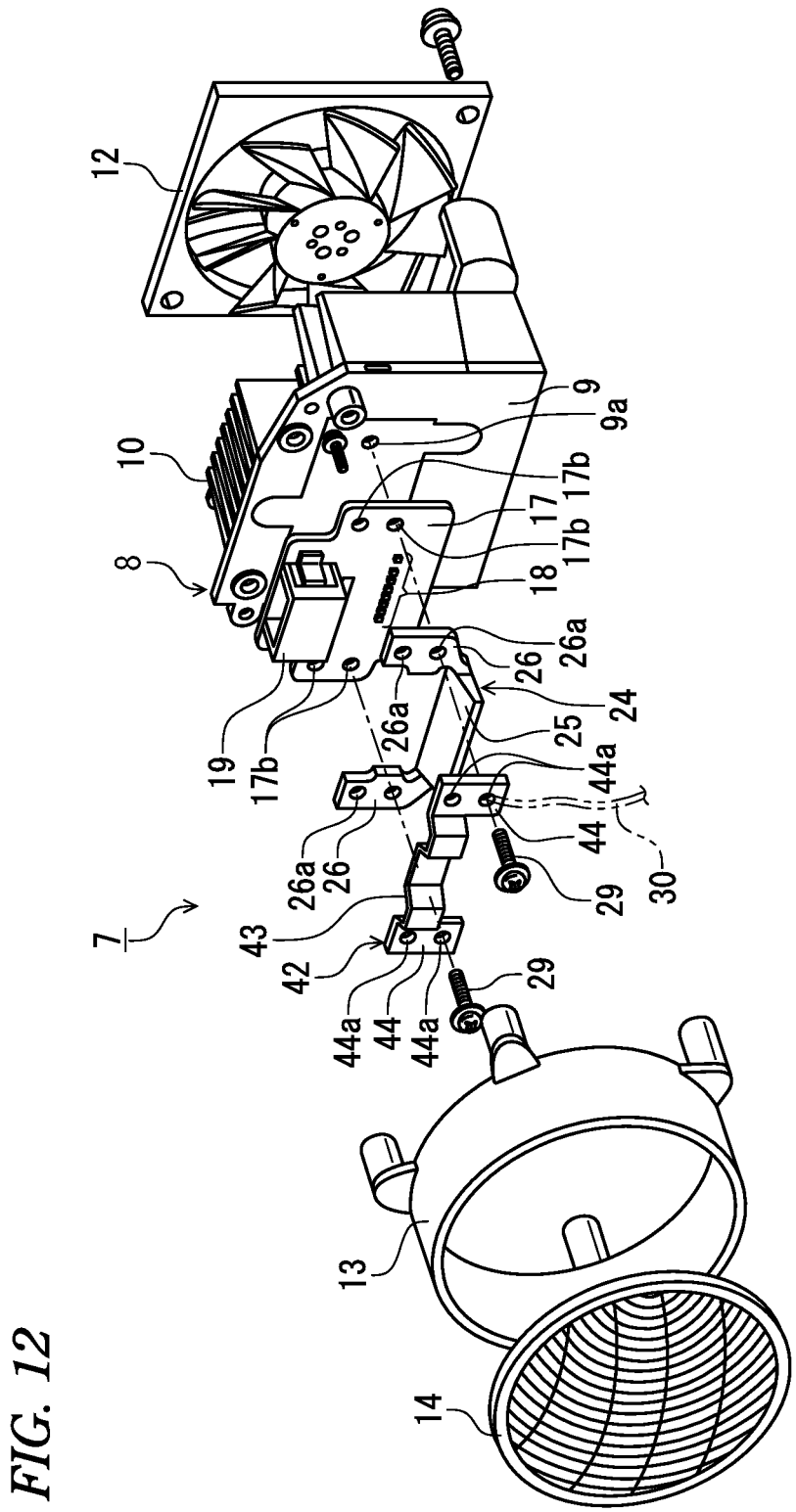
FIG. 12 is a perspective view showing an LED unit used in a vehicle lamp according to a sixth exemplary embodiment.

FIGS. 5 to 7 show second, third, and fourth exemplary embodiments, respectively. FIGS. 8 to 11 show a fifth exemplary embodiment. FIG. 12 shows a sixth exemplary embodiment. In each of these exemplary embodiments, constituent elements that are the same as those in the preceding exemplary embodiment(s) will be given the same reference symbols and will not be described redundantly.

In the second exemplary embodiment shown in FIG. 5, the grounding wire harness 30 is connected to a grounding wire 33 which is connected to the vehicle body and the LED driver module (LDM) 21. As a result, static electricity to be stored in the reflector 24 is immediately guided to the vehicle body by the attachment portion 26, the grounding wire harness 30, and the grounding wire 33. It can be prevented that the static electricity is discharged between the reflector 24 and the LEDs 18 which are in proximity to the reflector 24. In FIG. 5, symbol "+B" denotes a power source.

In the third exemplary embodiment shown in FIG. 6, a grounding interconnection pattern 32 is formed on the circuit board surface 17a of the circuit board 17 so as to be connected to the vehicle body. The attachment portion 26 (inner surface) of the reflector 24 is in contact with the grounding interconnection pattern 32. As a result, static electricity to be stored in the reflector 24 is immediately guided to the vehicle body utilizing the grounding interconnection pattern 32 formed on the circuit board 17. It can thereby be prevented that the static electricity is discharged between the reflector 24 and the LEDs 18 which are in proximity to the reflector 24.

This exemplary embodiment is very simple in configuration because no such wire as the grounding wire harness 30 is used to guide static electricity to the vehicle body.

In the fourth exemplary embodiment shown in FIG. 7, the reflector 24 (attachment portions 26) is electrically connected to the heat sink 8 utilizing the metal tapping screws 29 (see FIG. 4). The heat sink 8 is connected to the metal case 22 of the LED driver module 21 by a grounding wire harness 34. The metal case 22 is connected to the vehicle body by the grounding wire harness 31 (see FIG. 2; not shown in FIG. 7). Therefore, static electricity to be stored in the reflector 24 is immediately guided to the heat sink 8 by means of the metal tapping screws 29 and then to the vehicle body via the grounding wire harness 34 and the metal case 22. As a result, in this case, such a phenomenon can be prevented that static electricity stored in the reflector 24 is discharged between the reflector 24 and the LEDs 18 which are in proximity to the reflector 24.

The fifth exemplary embodiment shown in FIGS. 8 to 11 is a modification example of the first exemplary embodiment. In the fifth exemplary embodiment, one end of the grounding wire harness 30 is connected to a connection terminal 40 that is held between one of the attachment portions 26 of the reflector 24 and the circuit board 17.

The connection terminal 40 is formed in a flat plate shape and is a conductive member such as a metal. The connection terminal 40 includes a main portion 40a having a band plate shape and connection portions 40b. The main portion 40a is held between the attachment portion 26 of the reflector 24 and the circuit board 17. The connection portions 40b protrude from the main portion 40a outwardly and in one of widthwise directions of the main portion 40a (see FIG. 10). Two attachment holes 40c are formed in the main portion 40a of the connection terminal 40. The two attachment holes 40c are spaced from each other in a direction in which the main portion 40a extends. The two attachment holes 40c correspond to the two respective attachment holes 26a of the attachment portion 26 of the reflector 24. When the main portion 40a is held between the attachment portion 26 of the reflector 24 and the circuit board 17, the attachment holes 40c of the main portion 40a overlap with the attachment holes 26a of the one attachment portion 26, the corresponding attachment holes 17b of the circuit board 17, and the corresponding screw holes 9a of the support plate portion 9, respectively. With this positional relationship, tapping screws 29 are inserted into the attachment holes 26a, 40c, and 17b and screwed into the screw holes 9a, respectively.

In a state where the main portion 40a is held between the one attachment portion 26 of the reflector 24 and the circuit board 17, the connection portions 40b stick out of the attachment portion 26 etc. The one end portion of the grounding wire harness 30 is connected to one of the sticking connection portions 40b.

With this structure, the reflector 24 is electrically connected to the vehicle body via the attachment portion 26, the connection terminal 40, the grounding wire harness 30, the metal case 22, and the grounding wire harness 31. Since static electricity to be stored in the reflector 24 is immediately guided to the vehicle body, such a phenomenon can be prevented that static electricity stored in the reflector 24 is discharged between the reflector 24 and the LEDs 18 which are in proximity to the reflector 24. As a result, the LEDs 18 can be prevented from being damaged electrically (electrostatic breakdown), and occurrence of noise (static electricity surge) due to discharge of static electricity can be prevented.

Figure 9:
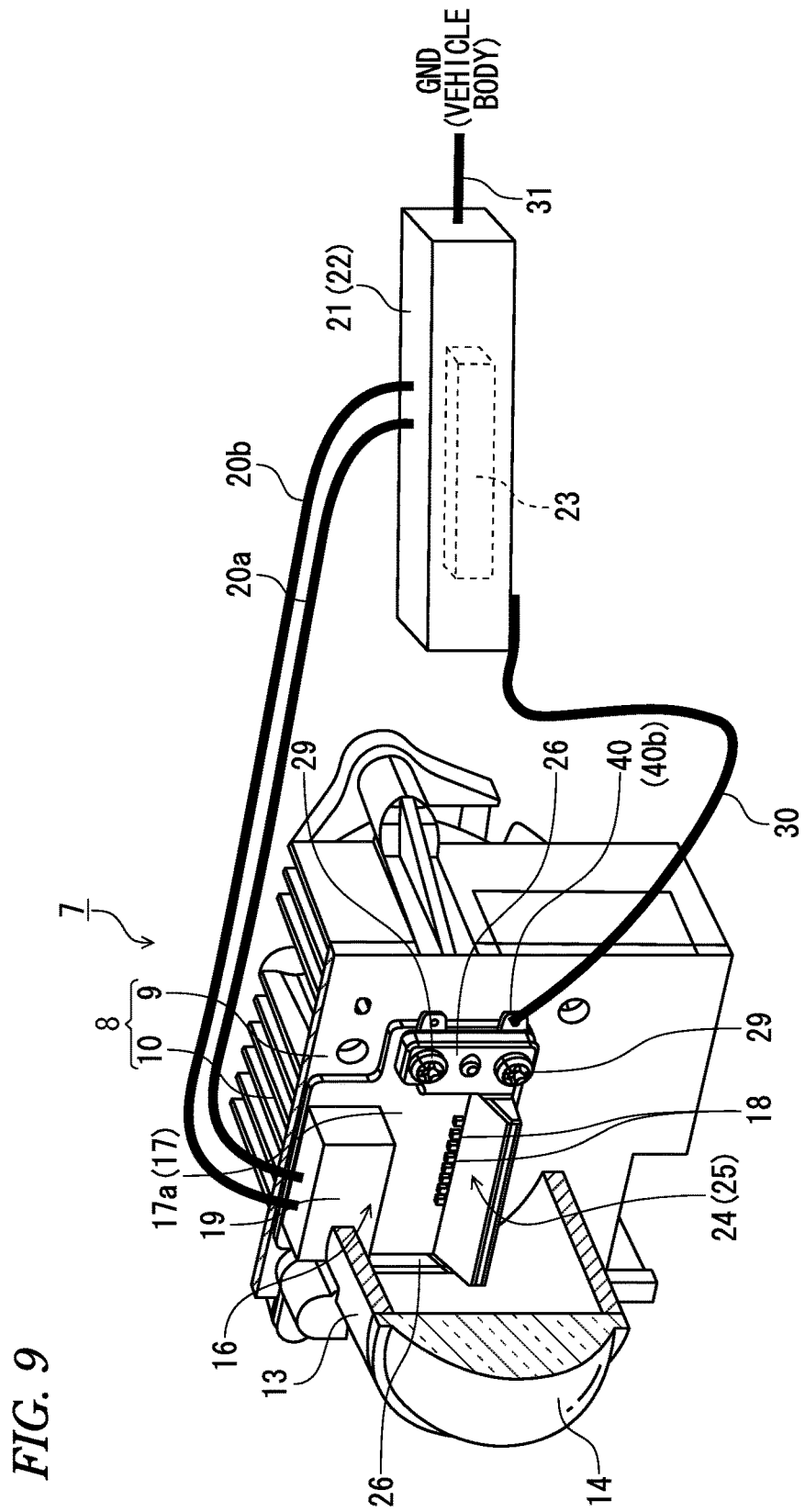
FIG. 9 is a perspective view showing an LED unit used in the vehicle lamp according to the fifth exemplary embodiment.
Figure 10:
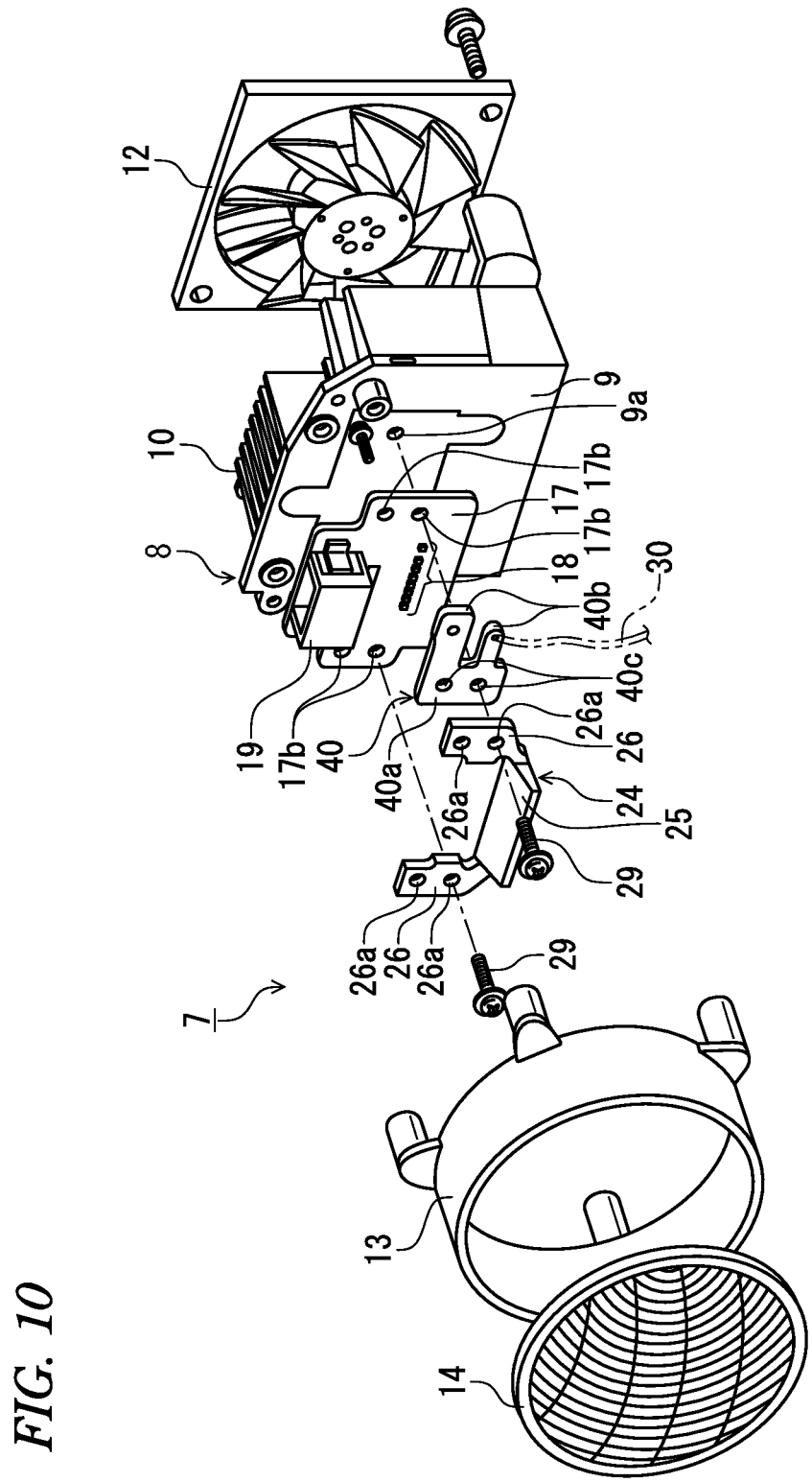
FIG. 10 is an exploded perspective view showing the LED unit of the vehicle lamp according to the fifth exemplary embodiment.
Figure 11:
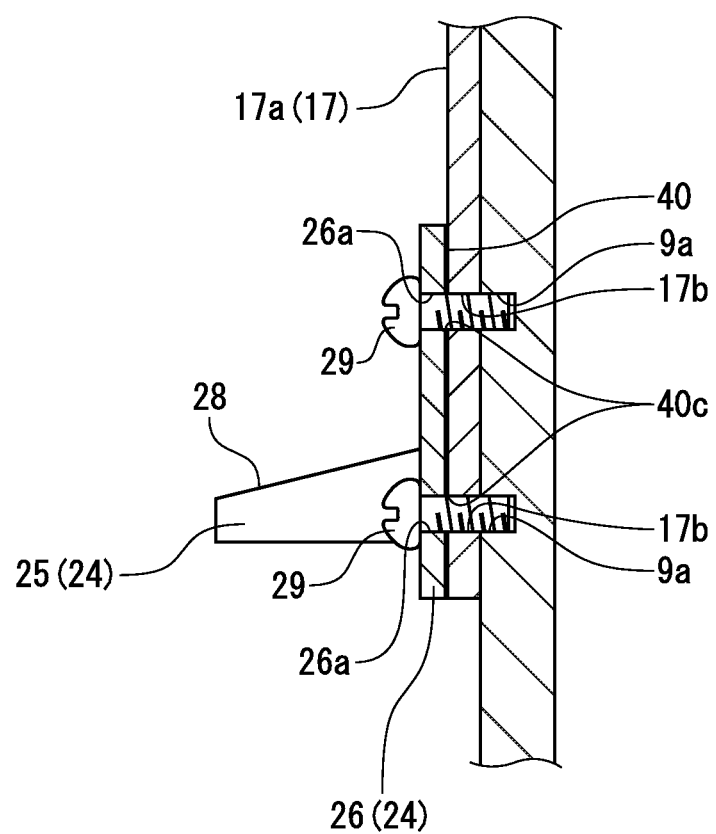
FIG. 11 is a vertical sectional view of a reflector of the vehicle lamp according to the fifth exemplary embodiment, taken through a position near one end portion (attachment portion) of the reflector in the direction in which the reflector extends.

In FIG. 9, reference numerals 20a and 20b denote a cathode connection wire and an anode connection wire, respectively, which are specific examples of the wire harness 20 used in the first exemplary embodiment (to connect the power source to the power supply connector 19 via the LED driver module (LDM) 21).

The sixth exemplary embodiment shown in FIG. 12 is also a modification example of the first exemplary embodiment. In the sixth exemplary embodiment, one end portion of the grounding wire harness 30 is connected to a shade 42 that is attached to the front surfaces of the attachment portions 26 of the reflector 24.

The shade 42 is formed from a conductive member having a band plate shape and made from a metal or the like. The shade 42 has a shade body 43 and attachment portions 44. The shade body 43 extends with being bent plural times. The attachment portions 44 are connected to both end portions of the shade body 43 in a direction in which the shade body 43 extends. Each attachment portion 44 is formed with attachment holes 44a so that the attachment holes 44a correspond to the respective attachment holes 26a of the associated attachment portion 26 of the reflector 24. The attachment portions 44 of the shade 42 are aligned with the respective attachment portions 26 of the reflector 24 while a plate surface of the shade 42 is directed in the front and rear direction. Thereby, the attachment holes 44a of the shade 42 overlap with the attachment holes 26a of the attachment portions 26, the attachment holes 17b of the circuit board 17, and the screw holes 9a of the support plate portion 9, respectively. With this positional relationship, tapping screws 29 are inserted into the attachment holes 44a, 26a, and 17b and screwed into the screw holes 9a, respectively. At this time, a head of one tapping screw 29 presses one end portion of the grounding wire harness 30 against the attachment portion 44 of the shade 42 (electrical connection is established therebetween).

Thus, the reflector 24 is electrically connected to the vehicle body via the attachment portion 26, the attachment portion 44 of the shade 42, the grounding wire harness 30, the metal case 22, and the grounding wire harness 31. Since static electricity to be stored in the reflector 24 is immediately guided to the vehicle body, such a phenomenon can be prevented that static electricity stored in the reflector 24 is discharged between the reflector 24 and the LEDs 18 which are in proximity to the reflector 24. As a result, in this exemplary embodiment, the LEDs 18 can be prevented from being damaged electrically (electrostatic breakdown), and occurrence of noise (static electricity surge) due to discharge of static electricity can be prevented.

Whereas the invention has been described based on the several exemplary embodiments, the invention also includes the following embodiments:

(1) The invention is applicable to various types of vehicle lamps so long as the LEDs 18 and the reflector 24 are employed. For example, the invention is applicable to a vehicle lamp in which the front cover (surface cover) 3 serves as a lens and the projection lens 14 which is disposed on an inner side of the front cover 3 is omitted.

(2) In place of the configuration that the heat sink 8 and the case of the LED driver module 21 are made from a metal(s), a surface of a heat sink and a surface of an LED driver module case may have a conductive coating (e.g., metal coating).

What is claimed is:

1. A vehicle lamp comprising:
   a transparent surface cover;
   light emitting diodes that emit light, the light emitting diodes being disposed on an inner side of the transparent surface cover;
   a conductive reflector that reflects the light emitted from the light emitting diodes toward the surface cover, the conductive reflector being provided between the light emitting diodes and the surface cover, the reflector being disposed so as to be in a state where the reflector is in proximity to the light emitting diodes;
   a grounding connection terminal that is disposed on the reflector, the grounding connection terminal being connected to a vehicle body;
   a conductive base connected to the vehicle body; and
   a resin circuit board disposed on the conductive base,
   wherein the light emitting diodes and the reflector are mounted on the circuit board, and
   wherein the grounding connection terminal of the reflector is attached to the conductive base by screwing a metal screw into the grounding connection terminal, the circuit board, and the conductive base.

2. The vehicle lamp according to claim 1, further comprising:
   a conductive case that houses a lighting control circuit configured to perform lighting control for the light emitting diodes,
   wherein the conductive case is connected to the vehicle body, and
   wherein the grounding connection terminal is connected to the conductive case.

3. The vehicle lamp according to claim 1,
   wherein the resin circuit board mounted with the light emitting diodes and the reflector,
   wherein a grounding interconnection pattern is formed on the circuit board so as to be connected to the vehicle body, and
   wherein the grounding connection terminal of the reflector is connected to the grounding interconnection pattern.

4. The vehicle lamp according to claim 1, wherein the state where the reflector is in proximity to the light emitting diodes is a state where the reflector and the light emitting diodes are spaced from each other by 1 mm or less.

* * * * *